No. 766,007. PATENTED JULY 26, 1904.
R. WENZELIDES.
SPEED REGULATOR FOR HYDRAULIC PRESSES.
APPLICATION FILED MAY 28, 1904.
NO MODEL. 2 SHEETS—SHEET 1.

Witnesses:
Arthur Gumpe
Fred. Anfricht

Inventor:
Rudolf Wenzelides
by Frank V. Briesen Att'y.

No. 766,007. PATENTED JULY 26, 1904.
R. WENZELIDES.
SPEED REGULATOR FOR HYDRAULIC PRESSES.
APPLICATION FILED MAY 28, 1904.
NO MODEL. 2 SHEETS—SHEET 2.

Witnesses:
Arthur Zumpe
Fred. Unfricht

Inventor:
Rudolf Wenzelides
by Stauss Briesen Att'y.

No. 766,007. Patented July 26, 1904.

UNITED STATES PATENT OFFICE.

RUDOLF WENZELIDES, OF NEW YORK, N. Y.

SPEED-REGULATOR FOR HYDRAULIC PRESSES.

SPECIFICATION forming part of Letters Patent No. 766,007, dated July 26, 1904.

Application filed May 28, 1904. Serial No. 210,218. (No model.)

*To all whom it may concern:*

Be it known that I, RUDOLF WENZELIDES, a citizen of Austria, residing at New York city, Manhattan, county and State of New York, have invented new and useful Improvements in Speed-Regulators for Hydraulic Presses, of which the following is a specification.

This invention relates to a speed-regulator for turbines and other hydraulic motors which is of high sensitiveness and insures a quick and reliable regulation of the motor.

Figure 1:
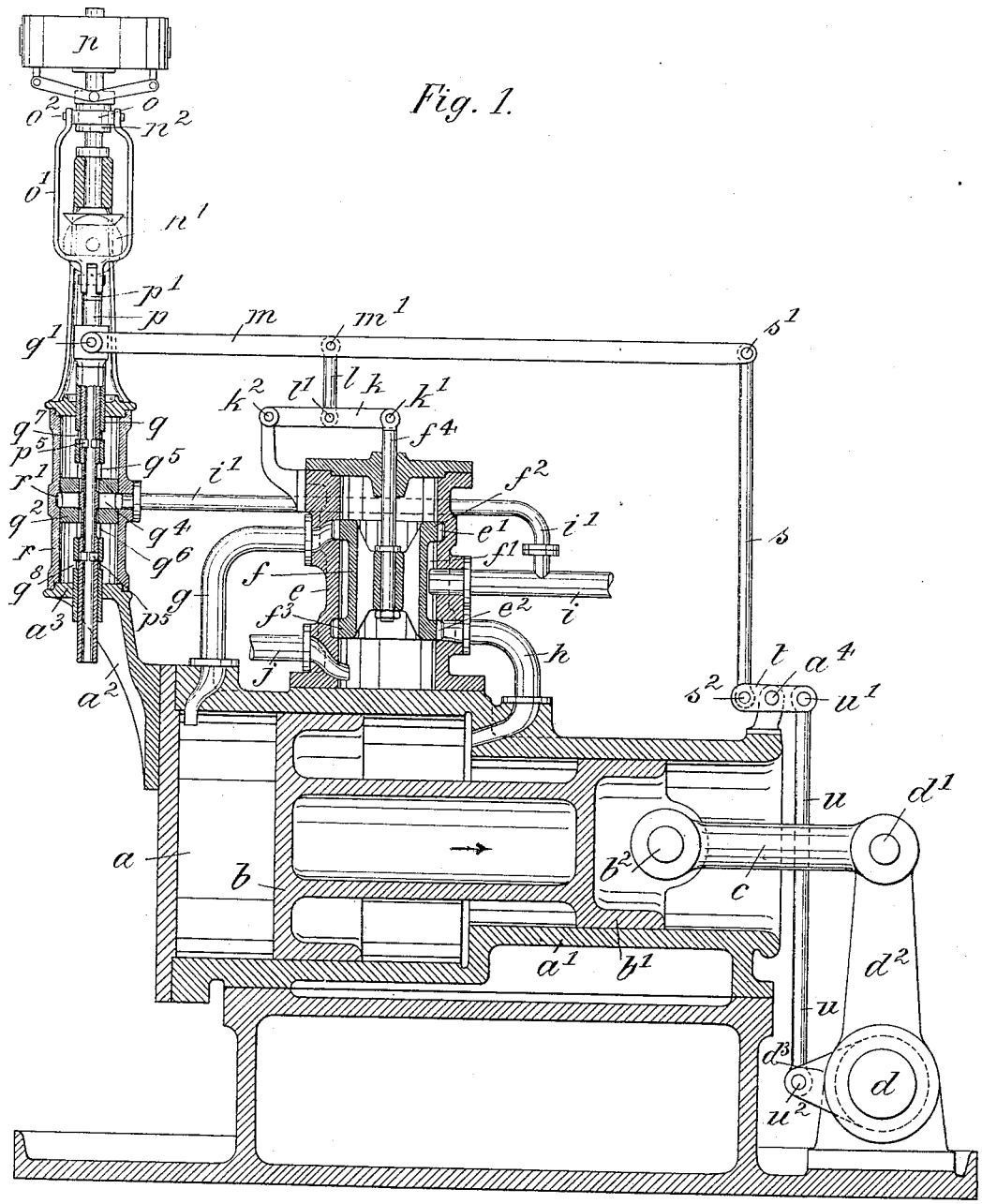
Figure 2:
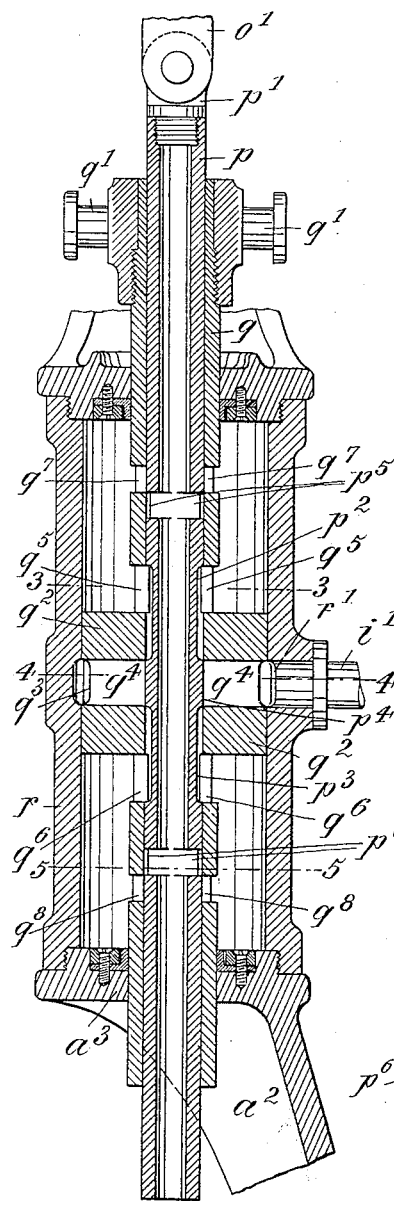
Figure 3:
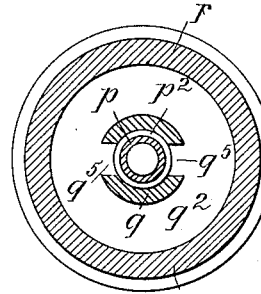
Figure 4:
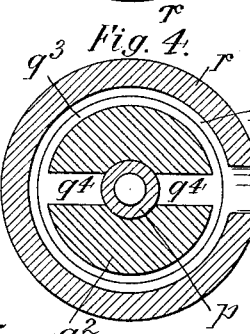
Figure 5:
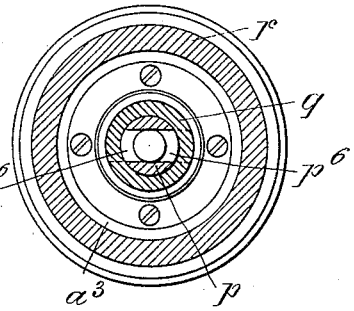

In the accompanying drawings, Figure 1 is a longitudinal section through a speed-regulator embodying my invention; Fig. 2, a detail vertical section through the governor-spindle and adjoining parts; Fig. 3, a cross-section on line 3 3, Fig. 2; Fig. 4, a cross-section on line 4 4, Fig. 2; Fig. 5, a cross-section on line 5 5, Fig. 2; and Fig. 6, a modification of Fig. 2.

The letter $a$ represents a cylinder containing a piston $b$, which may be guided in suitable manner. The drawings show the cylinder provided with a reduced section $a'$, in which a reduced piston-section $b'$ is adapted to slide. To piston-section $b'$ is pivoted at $b^2$ one end of a link $c$, the other end of which is connected at $d'$ to the free end of a lever $d^2$, rigidly mounted upon a regulating rock-shaft $d$. The shaft $d$ is connected in suitable manner to means (not shown) for setting the blades of the turbine, and thereby regulating the quantity of water admitted to the same.

Upon cylinder $a$ is mounted a valve-box $e$, containing a hollow slide-valve $f$. The inner cylindrical side of valve-box $e$ is provided with two circumferential grooves or channels $e'$ $e^2$. The channel $e'$ communicates by a pipe $g$ with one end of cylinder $a$, while channel $e^2$ communicates by a pipe $h$ with the opposite end of the cylinder. The slide-valve $f$ is provided with an outer circumferential groove $f'$, so as to form an upper flange $f^2$ and a lower flange $f^3$. The thickness of flanges $f^2$ $f^3$ corresponds to the width of channels $e'$ $e^2$, respectively, while the distance between the channels $e'$ $e^2$ corresponds to the width of valve-groove $f'$. Into valve-box $e$ opens an inlet-pipe $i$, arranged intermediate channels $e'$ $e^2$ and communicating with a pump or other means (not shown) for supplying oil or any other suitable medium under pressure. The lower section of valve-box $e$ is provided with an oil-outlet pipe $j$. The stem $f^4$ of valve $f$ engages at $k'$ a lever $k$, pivoted at $k^2$ to a bracket of valve-box $e$. To lever $k$ is pivoted at $l'$ one end of a link $l$, the other end of which is pivoted at $m'$ to a lever $m$, influenced by the centrifugal governor $n$ in the following manner: The governor $n$, which may be of any suitable construction, receives rotary motion through bevel-gear $n'$ from the power-shaft of the turbine in the usual manner. The grooved sleeve $n^2$ of governor $n$ is embraced by a ring $o$, which is connected to a frame $o'$, as at $o^2$. To the lower end of frame $o'$ is bolted a plug $p'$, tapped into a hollow spindle $p$, which is open at the bottom. The spindle $p$ is telescoped by a tubular sleeve $q$, provided at its upper end with studs $q'$, which are engaged by lever $m$, hereinabove referred to.

The sleeve $q$ is integral with a plunger $q^2$, slidable within a cylindrical case $r$, the bottom $a^3$ of which is formed by a suitable bracket $a^2$ of cylinder $a$. This bottom, as well as the top of case $r$, is perforated to snugly embrace sleeve $q$. The case $r$ is provided with a compressed-oil-supply pipe $i''$, communicating with inlet-pipe $i$ and opening into an inner circumferential groove or channel $r'$ of case $r$. The plunger $q^2$ is provided with an outer circumferential groove $q^3$, the height of which corresponds to that of channel $r'$. Two diametrically opposite perforations or slits $q^4$ lead from groove $q^3$ to the bore of plunger $q^2$, the height of slits $q^4$ being equal to that of groove $q^3$. Directly above and below plunger $q^2$ sleeve $q$ is provided, respectively, with a pair of upper perforations $q^5$ $q^5$ and a pair of lower perforations $q^6$ $q^6$. The upper perforations $q^5$ establish communication between the interior of case $r$ above plunger $q^2$ and an upper circumferential groove $p^2$ of spindle $p$. Likewise the lower perforations $q^6$ establish communication between the interior of case $r$ below plunger $q^2$ and a lower circumferential groove $p^3$ of spindle $p$. Intermediate grooves $p^2$ $p^3$ there is formed a collar $p^4$, that corresponds in height to the height of slits $q^4$.

At a distance above perforations $q^5$ sleeve $q$ is provided with a pair of upper perforations or openings $q^7$ $q^7$ and below perforations $p^6$ with a pair of lower openings $q^8$ $q^8$. The upper openings $q^7$ are adapted to coöperate with a pair of upper exhaust-perforations $p^5$ of spindle $p$, while the lower openings $q^8$ are adapted to coöperate with a pair of lower exhaust-perforations $p^6$ of spindle $p$. The perforations $p^5$ $p^6$, which are substantially of the same height as openings $q^7$ $q^8$, are so located that in the normal position of spindle $p$ and sleeve $q$ the bottom of openings $q^7$ is in alinement with the top of perforations $p^5$, while the top of openings $q^8$ is in alinement with the bottom of perforations $p^6$.

To lever $m$ is pivoted at $s'$ a link $s$, which in turn is pivoted at $s^2$ to one arm of a double lever $t$, fulcrumed at $a^4$ to cylinder-section $a'$. The other arm of lever $t$ is pivoted at $u'$ to a link $u$, which is pivoted at $u^2$ to a lever $d^3$, fast on rock-shaft $d$.

The operation is as follows: Cylinder $a$, valve-box $e$, case $r$, and the connecting-pipes are filled with oil under pressure. While the turbine works at the proper speed, slide-valve $f$, spindle $p$, and sleeve $q$ are in the positions shown in Figs. 1 and 2. In this normal position flanges $f^2$ $f^3$ of slide-valve $f$ will cover grooves $e'$ $e^2$, respectively. Likewise collar $p^4$ of spindle $p$ covers slits $q^4$ of sleeve $q$, while perforations $p^5$ $p^6$ are covered by sleeve $q$. If the turbine works too fast, governor $n$ will cause sleeve $n^2$ to raise and take along frame $o'$, together with spindle $p$. By this upward movement of spindle $p$ collar $p^4$ will be raised within plunger $q^2$, so as to uncover groove $p^3$ of spindle $p$. Simultaneously perforations $p^5$ will come into communication with openings $q^7$. In this way oil under pressure will be free to flow from supply-pipe $i'$ through grooves $r'$ $q^3$, slits $q^4$, and groove $p^3$ into the interior of case $r$ below plunger $q^2$. This inflow of oil under pressure beneath plunger $q^2$ will raise the same, the oil above the plunger being discharged through opening $q^7$, perforation $p^5$, and hollow spindle $p$. The upward movement of plunger $q^2$ will, by sleeve $q$ and studs $q'$, be transmitted to lever $m$, so as to swing the latter upward on pivot $s'$. The result of this upward movement of lever $m$ is a corresponding raising of slide-valve $f$ by means of link $l$, lever $k$, and valve-stem $f^4$. Owing to this movement of valve $f$, flanges $f^2$ $f^3$ will uncover channels $e'$ $e^2$, respectively. In this way oil under pressure will flow from supply-pipe $i$ through groove $f'$, channel $e'$, and pipe $g$ into cylinder $a$ behind piston $b$. This inflow of oil will cause the piston to advance in the direction of the arrow, Fig. 1, while the oil in front of the piston is simultaneously discharged through pipe $h$, channel $e^2$, lower section of valve-box $e$, and outlet-pipe $j$. The forward movement of piston $b$ will, by link $c$ and lever $d^2$, rock regulating-shaft $d$ to set the blades of the turbine. The rocking movement of shaft $d$ will, by lever $d^3$, link $u$, lever $t$, and link $s$, swing lever $m$ downwardly on studs $q'$. The result of this downward motion of lever $m$ will be a corresponding downward movement of slide-valve $f$ by means of link $l$, lever $k$, and valve-stem $f^4$. By this descent of valve $f$ flanges $f^2$ $f^3$ will again cover channels $e'$ $e^2$, respectively, to stop the inflow of oil and to thus prevent overregulation. If the turbine works too slow, the spindle $p$ will be lowered to uncover groove $p^2$ and to bring perforations $p^6$ into communication with openings $q^8$. In this case oil under pressure will flow from pipe $i''$ through grooves $r'$ $q^3$, slits $q^4$, and groove $p^2$ into the interior of case $r$ above plunger $q^2$. This will cause the latter to descend, the oil underneath plunger $q^2$ being discharged through opening $q^8$, perforations $p^6$, and hollow spindle $p$. The descent of plunger $q^2$ will be transmitted to lever $m$ by studs $q'$, so as to swing lever $m$ downwardly on pivot $s'$. The valve $f$ will be correspondingly lowered by the means described, so that flanges $f^2$ $f^3$ will uncover channels $e'$ $e^2$, respectively. Oil under pressure will now flow from pipe $i$ through groove $f'$, channel $e^2$, and pipe $h$ into cylinder $a$ in front of piston $b$. This inflow of oil will cause the piston to recede, the oil behind the piston being simultaneously exhausted through pipe $g$, channel $e'$, upper portion of valve-box $e$, hollow valve $f$, lower portion of box $e$, and discharge-pipe $j$. The back stroke of piston $b$ will, by link $c$ and lever $d^2$, rock the regulating-shaft $d$ in a direction opposite to that previously described to correspondingly set the blades of the turbine. The rocking movement of shaft $d$ will by the mechanism described swing lever $m$ upwardly on studs $q'$. This upward motion will be transmitted to valve $f$, so that the channels $e'$ $e^2$ are closed and the inflow of oil is stopped.

Figure 6:
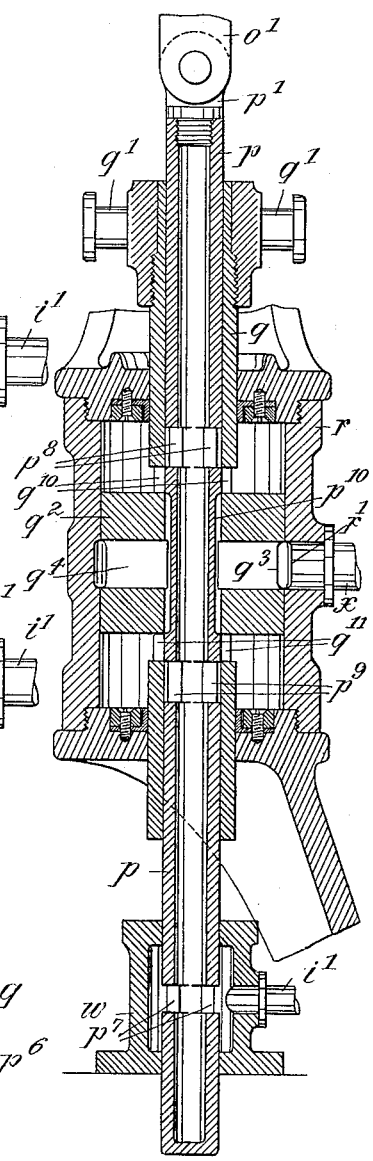

Fig. 6 illustrates a modification of my invention, the oil flowing through case $r$ in the opposite direction. The oil-inlet pipe $i''$ opens into a box $w$, the top and bottom of which snugly embrace hollow spindle $p$, which is closed at both ends. Within box $w$ spindle $p$ is provided with openings $p^7$ to conduct the oil from the box into the interior of the spindle. The portion of the latter which is contained within case $r$ is provided with a pair of upper perforations $p^8$ $p^8$ and a pair of lower perforations $p^9$ $p^9$. The perforations $p^8$ $p^8$ are at their bottom normally in alinement with the upper sides of openings $q^{10}$ $q^{10}$ of sleeve $q$, while the perforations $p^9$ $p^9$ are at their top in alinement with the lower sides of openings $q^{11}$ $q^{11}$ of sleeve $q$. Between the perforations $p^8$ $p^9$ the spindle $p$ is provided with a circumferential groove $p^{10}$, the height of which corresponds to the height of plunger $q^2$. With the circumferential groove $r'$ of case $r$ communicates an outlet-pipe $x$. If now, for instance, spindle $p$ is raised by the governor $n$, oil under pressure will flow from pipe $i''$ through box $w$, openings $p^7$, hollow spindle $p$, perforations $p^9$, openings $q^{11}$ into the interior of case $r$ below plunger $q^2$, so as to raise the same. The oil above plunger $q^2$ is simultaneously discharged through groove $p^{10}$, slits $q^4$, grooves $q^3$ $r'$, and outlet $x$.

It will be seen that by my construction the studs $q'$ form fixed pivots for lever $m$, while the latter is swung by link $s$. These studs $q'$ are temporarily stationary, because they are made integral with plunger $q^2$, which is held in an immovable position as long as collar $p^4$ covers slits $q^4$; but this temporary fixing of studs $q'$ does not interfere with the sensitiveness of the governor, as its spindle can be freely moved up and down within sleeve $q$. This free movement of spindle $p$ is immediately followed by a corresponding movement of the plunger $q^2$, together with studs $q'$, by the action of the compressed oil in the manner described in order to actuate the slide-valve.

The time that elapses between the motion of spindle $p$ and the motion of sleeve $q$ may practically be left out of consideration, as the volume of case $r$ is comparatively very small, so that the oil after having been admitted to the same acts instantaneously to operate plunger $q^2$. It will be seen that by my invention the governor is not influenced by the rock-shaft $d$ while returning the controlling-valve $f$ to its normal position. During this movement of the rock-shaft the fulcrum $q'$ of lever $m$ is fixed in position independently of governor $n$ by plunger $q^2$ and the oil contained within case $r$. Even in case the governor-spindle is not at rest while rock-shaft $d$ returns the slide-valve $f$ the pressure exerted upon fulcrum $q'$ is taken up by the pressure of the oil within case $r$ and is not transmitted to the governor. In this way I am enabled to employ a governor of great sensitiveness, so that a quick and reliable regulation of the turbine may be insured.

What I claim is—

1. In a speed-regulator, the combination of a governor with a hollow spindle connected thereto, a sleeve having a plunger and telescoping the spindle, a case surrounding the sleeve, a slide-valve, and means for operatively connecting the sleeve to said valve, substantially as specified.

2. In a speed-regulator, the combination of a sleeve having a perforated plunger with an inclosed hollow spindle having a pair of circumferential grooves and an intermediate collar which is adapted to register with the plunger-perforations, a governor connected to the spindle, a slide-valve, and means for operatively connecting the sleeve to said valve, substantially as specified.

3. In a speed-regulator, the combination of a sleeve having a grooved perforated plunger with an inclosed hollow spindle having a pair of circumferential grooves and an intermediate collar which is adapted to register with the plunger-perforations, a case surrounding the plunger and having a groove adapted to register with the plunger-groove, and a governor connected to the spindle, substantially as specified.

4. In a speed-regulator, the combination of a perforated sleeve having a grooved perforated plunger with an inclosed grooved hollow spindle having perforations adapted to register with the sleeve-perforations, the spindle-groove being adapted to communicate with the plunger-perforation, a case surrounding the plunger and having a groove adapted to register with the plunger-groove, and a governor connected to the spindle, substantially as specified.

5. In a speed-regulator, the combination of a perforated sleeve having a grooved perforated plunger with an inclosed hollow spindle having a pair of circumferential grooves and an intermediate collar which is adapted to register with the plunger-perforations, a case surrounding the plunger and having a groove adapted to register with the plunger-groove, and a governor connected to the spindle, substantially as specified.

6. In a speed-regulator, the combination of a regulating rock-shaft, with a piston operatively connected thereto, a cylinder surrounding the piston, a valve-box communicating with the cylinder, an inclosed valve, a lever operatively connected to the valve, means for operatively connecting said lever to the rock-shaft, a sleeve to which the lever is pivoted, a plunger on the sleeve, a hollow spindle slidable within the sleeve, a governor connected to the spindle, a case surrounding the plunger, and means for admitting a pressure medium to the case above and below the plunger, substantially as specified.

Signed by me at New York city, (Manhattan,) New York, this 25th day of May, 1904.

RUDOLF WENZELIDES.

Witnesses:
WILLIAM SCHULZ,
FRANK V. BRIESEN.

It is hereby certified that in Letters Patent No. 766,007, granted July 26, 1904, upon the application of Rudolf Wenzelides, of New York, N. Y., the title of the invention was erroneously written and printed "Speed-Regulators for Hydraulic Presses," whereas the said title should have been written and printed *Speed-Regulators for Hydraulic Motors;* and that the said Letters Patent should be read with this correction therein that the same may conform to the record of the case in the Patent Office.

Signed and sealed this 16th day of August, A. D., 1904.

[SEAL.]
                E. B. MOORE,
                *Acting Commissioner of Patents.*